United States Patent
Nefzger et al.

(10) Patent No.: US 9,605,106 B2
(45) Date of Patent: Mar. 28, 2017

(54) POLYESTER POLYOLS MADE OF ISOPHTHALIC ACID AND/OR TEREPHTHALIC ACID AND OLIGOALKYL OXIDES

(75) Inventors: Hartmut Nefzger, Pulheim (DE); Erika Bauer, Jüchen (DE); Johannes Van De Braak, Hennef (DE); Jürgen Schlossmacher, Bergheim (DE); Silvia Kasperek, Wesseling (DE)

(73) Assignee: Covestro Deutschland AG, Leverkusen (DE)

( * ) Notice: Subject to any disclaimer, the term of this patent is extended or adjusted under 35 U.S.C. 154(b) by 505 days.

(21) Appl. No.: 13/322,989

(22) PCT Filed: May 18, 2010

(86) PCT No.: PCT/EP2010/003021
§ 371 (c)(1),
(2), (4) Date: Jan. 20, 2012

(87) PCT Pub. No.: WO2010/139395
PCT Pub. Date: Dec. 9, 2010

(65) Prior Publication Data
US 2012/0123009 A1    May 17, 2012

(30) Foreign Application Priority Data

May 30, 2009  (EP) .................... 09007267

(51) Int. Cl.
| | | |
|---|---|---|
| C08L 75/06 | (2006.01) |
| C08J 9/00 | (2006.01) |
| C07C 69/82 | (2006.01) |
| C08G 18/42 | (2006.01) |
| C08G 63/672 | (2006.01) |
| C08G 63/85 | (2006.01) |
| C08G 101/00 | (2006.01) |

(52) U.S. Cl.
CPC ...... *C08G 18/4252* (2013.01); *C08G 18/4211* (2013.01); *C08G 63/672* (2013.01); *C08G 63/85* (2013.01); *C08G 2101/005* (2013.01); *C08G 2101/0025* (2013.01); *C08G 2105/02* (2013.01)

(58) Field of Classification Search
None
See application file for complete search history.

(56) References Cited

U.S. PATENT DOCUMENTS

| | | | |
|---|---|---|---|
| 4,039,487 A | 8/1977 | Kolakowski et al. | |
| 4,753,967 A * | 6/1988 | Londrigan | 521/172 |
| 4,758,607 A | 7/1988 | Hallmark et al. | |
| 5,726,277 A | 3/1998 | Salsman | |
| 2006/0089453 A1* | 4/2006 | Pajerski | C08G 18/0823 524/589 |

* cited by examiner

Primary Examiner — Jeffrey Washville
(74) Attorney, Agent, or Firm — N. Denise Brown

(57) ABSTRACT

The present invention relates to a method for producing a polyester polyol having a concentration of ether groups in the range from 9.0 mol/kg of polyester polyol to 22 mol/kg polyester polyol, characterized in that (i) in a first step (A) isophthalic acid, optionally in the form of a $C_1$-$C_4$ alkyl ester, and/or terephthalic acid, optionally in the form of a $C_1$-$C_4$ alkyl ester, is reacted with (B) oligoethylene glycol of the formula H—$(OCH_2CH_2)_n$—OH having a numerical average number of oxyethylene groups n in the range from 3.0 to 9.0, in the presence of at least one catalyst selected from the group made up of tin(II) salts, bismuth(II) salts, and titanium tetraalkoxylates, at a temperature in the range from 160° C. to 240° C., and at a pressure in the range from 1 to 1013 mbar, for a duration in the range from 7 to 100 hours, and (ii) in a second step the reaction mixture resulting from step (i) is reacted with (C) phthalic acid and/or phthalic acid hydride, the polyester polyols obtained according to said method, and to the use thereof for producing PUR/PIR hard foam materials.

17 Claims, No Drawings

POLYESTER POLYOLS MADE OF ISOPHTHALIC ACID AND/OR TEREPHTHALIC ACID AND OLIGOALKYL OXIDES

BACKGROUND OF THE INVENTION

The present invention relates to a process for producing polyester polyols from isophthalic acid and/or terephthalic acid, oligoalkylene oxides and phthalic acid or phthalic anhydride, the polyester polyols obtainable by this process and the use thereof for producing rigid PUR/PIR foams.

Rigid PUR/PIR foams are produced today predominantly on the basis of polyester polyols, since these have a positive impact on the flame resistance of rigid PUR/PIR foams and their thermal conductivity. As raw materials in the production of polyester polyols, succinic acid, glutaric acid, adipic acid, phthalic acid/anhydride, terephthalic acid and isophthalic acid are primarily used. In addition to the polyester polyols, polyether polyols are occasionally also added to improve the solubility behaviour of pentanes towards the polyester polyols or to reduce the brittleness of isocyanurate-containing rigid PUR/PIR foams.

However, the use of aromatic acids, in particular the use of terephthalic acid, in the production of polyester polyols can lead to these being present in solid form at ambient temperature and thus makes them more difficult to process in industrial processes.

U.S. Pat. No. 4,758,607 discloses, for the production of these polyester polyols, high molecular-weight poly(ethylene terephthalate), PET, as the raw material basis, which is reworked by molecular weight-reducing reaction media, such as e.g. low molecular-weight glycols, also in the presence of low molecular-weight polycarboxylic acids, to form a new polyester polyol. However, it is a disadvantage of such a procedure that the PET first has to be collected in a complex process. Furthermore, it must be ensured that the material is correctly sorted and uncontaminated. Where recycled material is concerned, e.g. PET drinks bottles, for example the caps, which are generally made of poly(ethylene), have to be removed which is time-consuming. Where PET production waste is concerned, this raw material is not universally available but is linked to the presence of a PET production plant. A further disadvantage also consists in the fact that part of the glycol used for PET degradation according to the teaching of U.S. Pat. No. 4,758,607 has to be removed again by distillation, which is disadvantageous in terms of energy in view of the high boiling point of glycols.

U.S. Pat. No. 4,039,487 discloses polyester polyols based on terephthalic acid, tetraethylene glycol and phthalic anhydride. However, U.S. Pat. No. 4,039,487 does not disclose how the disadvantages known to the person skilled in the art of an esterification of these components, i.e. long reaction times as a result of the poor solubility of terephthalic acid, can be overcome. A further disadvantage is that, as a result of the rapid reaction of tetraethylene glycol with phthalic anhydride, the number of hydroxyl groups available for esterification of the terephthalic acid is rapidly reduced right at the start of the reaction, which has an unfavourable effect on the subsequent reaction of the less reactive terephthalic acid, since its rate of esterification is also, among other things, proportional to the concentration of free hydroxyl groups. An alternative was therefore sought to the use of significantly larger amounts of esterification catalysts, since such catalysts can negatively affect subsequent reactions with these polyester polyols, e.g. the production of PUR foams.

It was therefore one of the objects of the present invention to remedy the above-mentioned disadvantages of the prior art.

Many conventional rigid PUR/PIR foams based on polyester polyols, however, still fail to exhibit adequate flame resistance, since they generally only achieve fire protection class B3 according to DIN 4102-1.

SUMMARY OF THE INVENTION

It was therefore an object of the present invention to provide polyester polyols which, when used in rigid PUR/PIR foams, lead to improved flame resistance, in particular to rigid PUR/PIR foams which achieve fire protection class B2 according to DIN 4102-1 and/or the SBI Test (DIN EN 13823).

It was another object of the present invention to provide polyester polyols which can be readily processed in industrial processes in the production of rigid PUR/PIR foams and at the same time lead to improved flame resistance.

The object according to the invention is surprisingly achieved by the process according to the invention for producing polyester polyols with a concentration of ether groups in the range of between 9.0 mol/kg polyester polyol and 22 mol/kg polyester polyol, characterised in that (i) in the first step
 (A) isophthalic acid, optionally in the form of a $C_1$-$C_4$ alkyl ester, and/or terephthalic acid, optionally in the form of a $C_1$-$C_4$ alkyl ester, is reacted with
 (B) oligoethylene glycol of the formula H—$(OCH_2CH_2)_n$—OH with a number-average number of oxyethylene groups n in the range of between 3.0 and 9.0 in the presence of at least one catalyst selected from the group consisting of tin(II) salts, bismuth(II) salts and titanium tetraalkoxylates at a temperature in the range of between 160° C. and 240° C. and a pressure in the range of between 1 and 1013 mbar for a period in the range of between 7 and 100 hours, and (ii) in the second step the reaction mixture resulting from step (i) is reacted with (C) phthalic acid and/or phthalic anhydride.

DETAILED DESCRIPTION OF THE INVENTION

A $C_1$-$C_4$ alkyl ester of isophthalic acid refers to an ester selected from the group consisting of isophthalic acid dimethyl ester, isophthalic acid diethyl ester, isophthalic acid di-n-butyl ester and isophthalic acid diisobutyl ester.

Preferably, component (A) is terephthalic acid, optionally in the form of a $C_1$-$C_4$ alkyl ester. A $C_1$-$C_4$ alkyl ester of terephthalic acid refers to an ester selected from the group consisting of terephthalic acid dimethyl ester, terephthalic acid diethyl ester, terephthalic acid di-n-butyl ester and terephthalic acid diisobutyl ester. Within the meaning of the present invention, a compound of the general formula H—$(OCH_2CH_2)_n$—OH with n=1 has one oxyethylene group and no ether group;
n=2 has two oxyethylene groups and one ether group;
n=3 has three oxyethylene groups and two ether groups;
n=4 has four oxyethylene groups and three ether groups;
n=5 has five oxyethylene groups and four ether groups;

n=6 has six oxyethylene groups and five ether groups;
n=7 has seven oxyethylene groups and six ether groups;
n=8 has eight oxyethylene groups and seven ether groups and
n=9 has nine oxyethylene groups and eight ether groups.

Component (B) is preferably a mixture of various oligomeric ethylene glycols, the value n in the general formula H—$(OCH_2CH_2)_n$—OH giving the average number of oxyethylene groups in component (B). Particularly preferably, component (B) with n=2 contains less than 8 wt. %, most particularly preferably less than 3 wt. %, of oligomers. Thus, for the value n, it is also possible to obtain values that are not whole numbers, such as, for example, 3.1, 3.2 or 3.24.

Oligoethylene glycols (B) preferably have number-average molecular weights in the range of from 145 to 450 g/mol, particularly preferably in the range of from 150 to 250 g/mol.

The polyester polyol produced by the processes according to the invention preferably has an amount of ether groups in the range of between 10 mol/kg polyester polyol and 17 mol/kg polyester polyol.

Component (A) is preferably present in an amount of 8 to 50 wt. %, particularly preferably in an amount of 10 to 35 wt. %, based on the total amount of components A, B and C used to produce the polyester polyol according to the invention.

Component (B) is preferably present in an amount of 50 to 92 wt. %, particularly preferably in an amount of 65 to 90 wt. %, based on the total amount of components A, B and C used to produce the polyester polyol according to the invention.

Component (C) is preferably present in an amount of 1 to 25 wt. %, particularly preferably in an amount of 1 to 22 wt. %, most particularly preferably in an amount of 5 to 18 wt. %, based on the total amount of components A, B and C used to produce the polyester polyol according to the invention.

The polyester polyol produced by the processes according to the invention preferably has a hydroxyl number in the range of between 100 mg KOH/g and 400 mg KOH/g, particularly preferably in the range of between 110 mg KOH/g and 300 mg KOH/g, most particularly preferably in the range of between 150 mg KOH/g and 260 mg KOH/g.

The hydroxyl number of the polyester polyols can be determined on the basis of the standard DIN 53240. The acid number of the polyester polyols can be determined on the basis of the standard DIN 53402.

The molecular weights of the polyester polyols according to the invention are preferably in the range of from 280 to 1120 Da, particularly preferably from 370 to 1020 Da, most particularly preferably from 430 to 750 Da.

The polyester polyol produced by the processes according to the invention preferably has an acid number in the range of from 0.1 KOH/g to 4 mg KOH/g, particularly preferably in the range of from 0.15 KOH/g to 2.8 KOH/g.

The polyester polyol produced by the processes according to the invention preferably has a viscosity, measured in accordance with DIN 53019, in the range of between 400 mPas and 10000 mPas, particularly preferably in the range of between 500 mPas and 7000 mPas, at 25° C.

The oligoethylene glycol (B) preferably has a number-average number of oxyethylene groups n in the range of between 3.1 and 9, particularly preferably in the range of between 3.5 and 8.

The polyester polyol preferably has a melting point in the range of between −40° C. and 25° C., particularly preferably in the range of between −20 and 23° C.

The polyester polyol according to the invention is preferably made from a mixture comprising (i) in the first step terephthalic acid (A) and oligoethylene glycol (B) of the formula H—$(OCH_2CH_2)_n$—OH with a number-average number of oxyethylene groups n in the range of from 3.0 to 9.0, and (ii) in the second step at least one component (C) selected from the group consisting of phthalic acid and phthalic anhydride.

One preferred embodiment of the present invention is a process for producing polyester polyols, wherein in the first step (i) the components (A) and (B) are reacted in the presence of a catalyst selected from the group consisting of tin(II) salts, bismuth(II) salts and titanium tetraalkoxylates at a temperature in the range of between 160° C. and 240° C. and a pressure in the range of between 1 and 1013 mbar for a period in the range of between 7 and 100 hours.

Component (C) is preferably added only after 80-95% of the water of reaction and optionally low molecular-weight alcohol (for example methanol, ethanol, etc., i.e. those alcohols that have been formed from the reaction of components (A) and (B)) have been distilled off in the first step (i). The reaction of the intermediate product resulting from step (i) (formed by reaction of components (A) and (B)) with component (C) which is added later, i.e. in step (ii), takes place preferably at a temperature in the range of between 160 and 240° C. and a pressure in the range of between 1 and 150 mbar for a period in the range of between 1 and 22 hours.

To produce the polyester polyols according to the invention, all of the catalysts known to the person skilled in the art can be used. Preferably, tin(II) chloride, bismuth(II) chloride and titanium tetraalkoxylates (for example titanium tetramethanolate or titanium tetraethanolate) are used. Particularly preferred is the use of tin dichloride dihydrate. These catalysts (optionally the sum of the amounts used) are used in an amount of 20 to 200 ppm, most particularly preferably 45 to 80 ppm, based on the sum of the parts by weight of all the feedstock components A to C.

The reaction according to the invention of the components to produce the polyester polyol preferably takes place in substance (i.e. without any addition of solvent).

The present invention also provides the polyester polyol produced by the process according to the invention and a process for producing a PUR or PUR/PIR foam comprising the following steps:
a) reaction of at least one polyester polyol produced by the process according to the invention with
b) at least one polyisocyanate-containing component,
c) at least one blowing agent,
d) at least one or more catalysts,
e) optionally at least one flame retardant and/or other auxiliary substances and additives
f) optionally at least one compound with at least two isocyanate-reactive groups.

As the polyisocyanate-containing component, the conventional aliphatic, cycloaliphatic and in particular aromatic di- and/or polyisocyanates are suitable. Toluene diisocyanate (TDI), diphenylmethane diisocyanate (MDI) and in particular mixtures of diphenylmethane diisocyanate and polyphenylene polymethylene polyisocyanates (polymeric MDI) are preferably used. The isocyanates can also be modified, for example by incorporating uretdione, carbamate, isocyanurate, carbodiimide, allophanate and in particular urethane groups. To produce rigid polyurethane foams, polymeric MDI is used in particular. Isocyanurate formation takes place in the prior art virtually exclusively during the foaming reaction, and leads to flame-resistant PUR/PIR foams which are preferably used in industrial rigid foam, for example in the construction sector as insulation board, sandwich elements, pipe insulation and lorry bodies.

As compounds with at least two isocyanate-reactive groups, i.e. with at least two hydrogen atoms that are reactive with isocyanate groups, it is generally possible to use compounds which are described in general terms below.

As compounds with at least two isocyanate-reactive groups, in particular those carrying two or more reactive groups selected from OH groups, SH groups, NH groups, $NH_2$ groups and CH-acidic groups, such as e.g. β-diketo groups, in the molecule are suitable. To produce the rigid polyurethane foams preferably produced by the process according to the invention, in particular compounds with 2 to 8 OH groups are used. Polyether polyols and/or polyester polyols are preferably used. The hydroxyl number of the polyether polyols and/or polyester polyols used is preferably 25 to 850 mg KOH/g, particularly preferably 25 to 550 mg KOH/g, in the production of rigid polyurethane foams, and the molecular weights are preferably greater than 300 g/mol. The component (f) preferably contains polyether polyols, which are produced by known processes, for example by anionic polymerisation with alkali hydroxides, such as sodium or potassium hydroxide, or alkali alcoholates, such as sodium methylate, sodium or potassium ethylate or potassium isopropylate as catalysts and with the addition of at least one starter molecule containing 2 to 8, preferably 2 to 6, bound reactive hydrogen atoms, or by cationic polymerisation with Lewis acids, such as antimony pentachloride, borofluoride etherate etc. or bleaching clay as catalysts, from one or more alkylene oxides with 2 to 4 carbon atoms in the alkylene residue. Furthermore, the production of the polyether polyols can take place by double metal cyanide catalysis, in which case continuous operation is also possible.

Suitable alkylene oxides are e.g. tetrahydrofuran, 1,3-propylene oxide, 1,2- and 2,3-butylene oxide, styrene oxide and preferably ethylene oxide and 1,2-propylene oxide. The alkylene oxides can be used individually, alternately in succession or as mixtures. Suitable starter molecules include, for example, glycerol, trimethylol-propane, pentaerythritol, sucrose, sorbitol, methylamine, ethylamine, isopropylamine, butylamine, benzylamine, aniline, toluidine, toluenediamine, naphthylamine, ethylenediamine, diethylenetriamine, 4,4'-methylene dianiline, 1,3-propanediamine, 1,6-hexanediamine, ethanolamine, diethanolamine, triethanolamine and other dihydric or polyhydric alcohols, which in turn can also be oligoether polyols or mono- or polyvalent amines, and water.

In addition, the component (f) may optionally contain polyester polyols, chain extenders and/or crosslinking agents. As chain extenders and/or crosslinking agents, in particular bifunctional or trifunctional amines and alcohols, in particular diols and/or triols with molecular weights of less than 400 g/mol, preferably of 60 to 300, are used. As compound (f), preferably polyether polyols and/or polyester polyols with a hydroxyl number greater than 160, particularly preferably greater than 200 mg KOH/g and particularly preferably with a functionality of between 2.9 and 8 are used. Particularly preferably, polyether polyols having an equivalent weight, i.e. molecular weight divided by the functionality, of less than 400 g/mol, preferably less than 200 g/mol, are used as isocyanate-reactive compounds (f). Compound (f) is generally present in liquid form.

As blowing agent component (c), hydrocarbons are preferably used. These can be used in a mixture with water and/or additional physical blowing agents. These are understood to mean compounds which are dissolved or emulsified in the feedstocks for polyurethane production and evaporate under the conditions of polyurethane formation. They are, for example, hydrocarbons, halogenated hydrocarbons and other compounds, such as e.g. perfluorinated alkanes, such as perfluorohexane, chlorofluorocarbons, and ethers, esters, ketones and/or acetals.

The blowing agent component (c) is used preferably in a quantity of 2 to 45 wt. %, preferably 3 to 30 wt. %, particularly preferably 4 to 20 wt. %, based on the total weight of components (b) to (f). In one preferred embodiment, the blowing agent mixture (c) contains hydrocarbons, in particular n-pentane and/or cyclopentane, and water. Particularly preferred hydrocarbons are n-pentane, cyclopentane, iso-pentane and/or mixtures of the isomers. In particular, cyclopentane and/or n-pentane are used as blowing agents (c).

As catalysts (d) for the production of the polyurethane and polyisocyanurate foams according to the invention, the conventional and known polyurethane- or polyisocyanurate-forming catalysts are used, for example organic tin compounds, such as tin diacetate, tin dioctoate, dibutyltin dilaurate, and/or strongly basic amines, such as 2,2,2-diazabicyclooctane, triethylamine or preferably triethylenediamine, N,N-dimethylcyclohexylamine or bis(N,N-dimethylaminoethyl)ether, and to catalyse the PIR reaction potassium acetate, potassium octoate and aliphatic quaternary ammonium salts.

The catalysts are preferably used in a quantity of 0.05 to 3 wt. %, preferably 0.06 to 2 wt. %, based on the total weight of all the components.

The reaction of the above-mentioned components optionally takes place in the presence of (e) additives, such as e.g. flame retardants, fillers, cell regulators, foam stabilisers, surface-active compounds and/or stabilisers against oxidative, thermal or microbial degradation or ageing, preferably flame retardants and/or foam stabilisers. Substances which promote the formation of a regular cell structure during foam formation are referred to as foam stabilisers. The following are mentioned as examples: silicone-containing foam stabilisers, such as siloxane-oxyalkylene copolymers and other organopolysiloxanes, and also alkoxylation products of fatty alcohols, oxo alcohols, fatty amines, alkyl phenols, dialkyl phenols, alkyl cresols, alkyl resorcinol, naphthol, alkyl naphthol, naphthylamine, aniline, alkyl aniline, toluidine, bisphenol A, alkylated bisphenol A, polyvinyl alcohol, and in addition, alkoxylation products of condensation products of formaldehyde and alkyl phenols, formaldehyde and dialkyl phenols, formaldehyde and alkyl cresols, formaldehyde and alkyl resorcinol, formaldehyde and aniline, formaldehyde and toluidine, formaldehyde and naphthol, formaldehyde and alkyl naphthol, and formaldehyde and bisphenol A. As alkoxylation reagents it is possible to use e.g. ethylene oxide, propylene oxide, poly-THF and higher homologs.

In general, the flame retardants known from the prior art can be used as flame retardants. Suitable flame retardants are e.g. brominated ethers (e.g. Ixol® B251), brominated alcohols, such as dibromoneopentyl alcohol, tribromoneopentyl alcohol and PHT-4-diol, as well as chlorinated phosphates, such as e.g. tris(2-chloroethyl)phosphate, tris(2-chloroisopropyl)phosphate (TCPP), tris(1,3-dichloroisopropyl)phosphate, tris(2,3-dibromopropyl)phosphate and tetrakis(2-chloroethyl)ethylene diphosphate. As well as the halogen-substituted phosphates already mentioned, inorganic flame retardants, such as red phosphorus, preparations containing red phosphorus, aluminium oxide hydrate, antimony trioxide, ammonium polyphosphate and calcium sulfate, or cyanuric acid derivatives, such as e.g. melamine, or mixtures of at least two flame retardants, such as e.g. ammonium polyphosphates and melamine, and optionally starch can be used to flameproof the rigid PUR or PUR/PIR foams according to the invention. As additional liquid halogen-free flame retardants it is possible to use diethyl ethane phosphonate (DEEP), triethyl phosphate (TEP), dimethyl propyl phosphonate (DMPP), cresyl diphenyl phosphate (CDP) and others. The flame retardants are used within the framework of the present invention preferably in a quantity of 0 to 30 wt. %, particularly preferably 2 to 25 wt. %, in particular 2.5 to 15 wt. %, based on the total weight of components (b) to (e).

Further details of the above-mentioned and other starting materials can be taken from the specialist literature, for example the Kunststoffhandbuch, vol. VII, Polyurethane, Carl Hanser Verlag Munich, Vienna, 1st, 2nd and 3rd editions 1966, 1983 and 1993.

To produce the rigid polyurethane foams, the polyisocyanates (b) and the components (a) and optionally (f) are reacted in quantities such that the isocyanate index of the foam is 90 to 600, preferably 150 to 500, particularly preferably 180 to 450.

The rigid polyurethane foams can be produced batchwise or continuously with the aid of known processes. Those known to the person skilled in the art include, inter alia, block foam production (continuous and batchwise), use in one-component systems (batchwise) and in moulded insulating foam (batchwise). The invention described here relates to all processes, but preferably to the continuous double belt process wherein flexible and/or rigid materials can be used as covering layers.

The rigid polyurethane foams according to the invention preferably have a closed cell ratio greater than 90%, particularly preferably greater than 95%.

The PUR and PUR/PIR foams according to the invention preferably have a density of 28 g/m$^3$ to 300 g/m$^3$, particularly preferably 30 g/m$^3$ to 50 g/m$^3$.

The rigid polyurethane foams according to the invention are used in particular for thermal insulation, for example in cooling equipment, containers or buildings, e.g. in the form of insulated pipes, sandwich elements, insulation boards or cooling equipment.

Polyurethanes within the meaning of the present patent application are also understood to include polymeric isocyanate adducts, which also contain other groups in addition to urethane groups, as formed for example by reaction of the isocyanate group with itself, for example isocyanurate groups, or which are formed by reaction of the isocyanate groups with groups other than hydroxyl groups, said groups generally being present in the polymer together with the urethane groups.

The present invention additionally provides the use of polyester polyols which are produced by the process described above for producing polyurethane. Polyurethane is a versatile material which is used in many areas. Owing to the wide variety of raw materials that can be used, products with extremely varied properties can be produced, for example rigid foams for insulation, flexible block foams for mattresses, moulded flexible foams for car seats and seat cushions, acoustic foams for sound insulation, thermoplastic foams, shoe foams or microcellular foams, but also compact casting systems and thermoplastic polyurethanes.

EXAMPLES

List of the raw materials used in the examples
Terephthalic acid: Interquisa
Phthalic anhydride (PA): Industrial PA from Lanxess
PEG 200: BASF
PEG 180: Ineos
Ethylene glycol (EG): Ineos
Tin(II) chloride dihydrate: Aldrich
Titanium tetrabutylate: Aldrich
Equipment and analytical methods used:
Viscometer: MCR 51 from Anton Paar
Hydroxyl number: based on standard DIN 53240
Acid number: based on standard DIN 53402
A) Production of Polyester Polyols

Example A-1

According to the Invention

In a 4-liter, 4-neck flask equipped with a Pilz heating mantle, mechanical stirrer, internal thermometer, 40 cm packed column, column head, descending high-efficiency condenser as well as a membrane vacuum pump, under nitrogen blanketing at 100° C., 2355 g (11.78 mol) PEG 200 were initially charged. Over the course of approx. 5 minutes, 412 g (2.48 mol) terephthalic acid were stirred in and 78 mg tin dichloride dihydrate were added. The mixture was heated to 230° C. for 5 hours, during which water distilled off and the haze in the reaction mixture disappeared. Then, 367 g (2.48 mol) phthalic anhydride (PA) were added and the mixture was heated for 4 hours to 230° C. A further 78 mg tin dichloride dihydrate were then added and a vacuum was applied at a final level of 60 mbar. Under these conditions, condensation was allowed to continue for a further 15 hours. The product was cooled and the following properties were determined:
Analysis of the polyester:
Hydroxyl number: 236.6 mg KOH/g
Acid number: 0.2 mg KOH/g
Viscosity: 720 mPas (25° C.)

The esters of the other examples according to the invention A-2 to A-4 and A-6 (C) were produced in a similar manner.

Example A-5

Comparison

In a 4-liter, 4-neck flask equipped with a Pilz heating mantle, mechanical stirrer, internal thermometer, 40 cm packed column, column head, descending high-efficiency condenser as well as a membrane vacuum pump, 1444 g (9.76 mol) PA were initially charged at 180° C. In the course of approx. 30 minutes, 1034 g (9.76 mol) diethylene glycol were added and the mixture was stirred for 60 minutes at 180° C. Then, 356 g (2.44 mol) adipic acid and 429 g (6.92 mol) ethylene glycol were added. From this mixture, water was distilled off for 3.5 hours at standard pressure. 65 mg tin dichloride dihydrate were added and the reaction was completed for a further 30 hours at 200° C. and 70 mbar, and 352 g (3.32 mol) diethylene glycol were subsequently added and the mixture was left to continue reacting for a further 6 hours at 200° C. and standard pressure. The product was cooled and the following properties were determined:
Analysis of the polyester:
Hydroxyl number: 235.2 mg KOH/g
Acid number: 0.7 mg KOH/g
Viscosity: 9150 mPas (25° C.)

f.) Stabiliser polyether-polysiloxane copolymer from Evonik

The foam additive (b-f) shown in Table 2 consists of 20 parts by weight component (b), 5 parts by weight component (c), 2.2 parts by weight component (d), 5 parts by weight component (e) and 4 parts by weight component (f).

TABLE 1

Composition and properties of polyester polyols according to the invention and not according to the invention

| | | A-1 | A-2 | A-3 | A-4 | A-5(C) | A-6(C) |
|---|---|---|---|---|---|---|---|
| Terephthalic acid | [g] | 412 | 472 | 524 | 586 | 0 | 887 |
| PEG 200 | [g] | 2355 | 2261 | 1956 | 1809 | 0 | 967 |
| Adipic acid | [g] | | | | | 356 | |
| Ethylene glycol | [g] | | | 196 | 219 | 429 | 644 |
| Diethylene glycol | [g] | | | | | 1386 | |
| PA | [g] | 367 | 420 | 467 | 522 | 1444 | 791 |
| Tin dichloride dihydrate | [mg] | 156 | 156 | 156 | 156 | 65 | |
| Titanium tetrabutylate | [mg] | | | | | | 235 |
| Hydroxyl number | [mg KOH/g] | 236.6 | 193.4 | 231.6 | 192.8 | 235.2 | 155.5 |
| Acid number | [mg KOH/g] | 0.2 | 0.3 | 1.8 | 2.7 | 0.7 | 0.4 |
| Viscosity, 25° C. | [mPas] | 720 | 1390 | 1500 | 3230 | 9150 | solid |
| Proportion terephthalic acid re. | [wt. %] | 13.1 | 15.0 | 16.7 | 18.7 | 0 | 27.0 |
| Proportion ether groups from oligoethylene glycol | [mol/kg ester] | 16.3 | 15.6 | 13.5 | 12.5 | 3.9 | 5.1 |
| Proportion ethylene glycol | [wt. %] | 0 | 0 | 6.2 | 7.0 | 11.9 | 19.6 |
| Proportion PA | [wt. %] | 11.7 | 13.3 | 14.9 | 16.6 | 39.9 | 24.0 |

C = comparative example

Comparative Example A-5 and Comparative Example A-6 are not according to the invention, since in A-5 (comparison) neither terephthalic acid nor oligoethylene glycol was used, and in A-5 (comparison) and A-6 (comparison) the proportion of ether groups from oligoethylene glycols is less than 9 mol/kg ester. A-6 (comparison), moreover, is not liquid at ambient temperature.

Raw Materials for Rigid PUR/PIR Foams:
a.) Polyester from Ex. A-1, A-2, A-3, A-4 and A-5(C).
Foam additives, consisting of b.)-f.):
b.) TCPP, tris(1-chloro-2-propyl)phosphate from Lanxess
c.) TEP, triethyl phosphate from Levagard
d.) Additive 1132 from Bayer MaterialScience
e.) PET V 657, trifunctional polyether polyol with a molecular weight of approx. 660 Da. from Bayer MaterialScience AG Activator (g) Carboxylic acid salt (PIR catalyst): Desmorapid® VP.PU 30HB13 from Bayer MaterialScience AG, Leverkusen, Germany.

Isocyanate: (h) Desmodur® VP.PU 44V70L, polymeric polyisocyanate based on 4,4'-diphenylmethane diisocyanate with an NCO content of approx. 31.5 wt. % from Bayer MaterialScience AG, Leverkusen, Germany.

Blowing agent (i) n-Pentane, Kremer & Martin.

TABLE 2

Composition and properties of polyester polyol-based PUR/PIR foams according to the invention and not according to the invention

| | | B-1 | B-2 | B-3 | B-4 | B-5(C) |
|---|---|---|---|---|---|---|
| Polyol from Ex. A-1 | [g] | 63.8 | | | | |
| Polyol from Ex. A-2 | [g] | | 63.8 | | | |
| Polyol from Ex. A-3 | [g] | | | 63.8 | | |
| Polyol from Ex. A-4 | [g] | | | | 63.8 | |
| Polyol from Ex. A-5(C) | [g] | | | | | 63.8 |
| Foam additive | [g] | 36.2 | 36.2 | 36.2 | 36.2 | 36.2 |
| n-Pentane (i) | [g] | 16 | 16 | 15.4 | 14.2 | 15.9 |
| Desmodur 44V70L | [g] | 165 | 142 | 157 | 137 | 165 |
| Index | | 344 | 346 | 345 | 345 | 345 |
| Properties: | | | | | | |
| Core density, determined | [kg/m³] | 38.2 | 38.2 | 37.7 | 35.4 | 36.1 |
| Setting time | [s] | 41 | 41 | 42 | 43 | 36.1 |
| Tack-free time | [s] | 150 | 110 | 115 | 120 | 82 |
| KBT class | | B2 | B2 | — | — | B2 |

TABLE 2-continued

Composition and properties of polyester polyol-based PUR/PIR foams according to the invention and not according to the invention

| | | Example: | | | | |
|---|---|---|---|---|---|---|
| | | B-1 | B-2 | B-3 | B-4 | B-5(C) |
| Av. flame height | [mm] | 115 | 123 | — | — | 125 |
| Fire class/flame height (BVD test) | [mm] | Cl. 5/100-120 | Cl. 3/110 | Cl. 5/120 | Cl. 5/123 | Cl. 5/100-110 |
| Dimensional stability: storage for 24 h at 80° C. | [%, x direction] | 0.2 | 0.2 | 0.0 | 0.0 | 0.6 |
| | [%, y direction] | 0.2 | 0.1 | 0.0 | 0.0 | 0.6 |
| | [%, z direction] | −0.8 | −0.8 | −0.6 | −0.8 | −0.4 |

C = comparative example

Index refers to the molar ratio of all the isocyanate groups to all the zerewittinof active hydrogen atoms.

On a laboratory scale, all of the raw materials for the rigid foam formulation, with the exception of the polyisocyanate component, are weighed into a paper cup, temperature-controlled at 23° C., mixed using a Pendraulik laboratory mixer (e.g. Type LM-34 from Pendraulik) and volatilised blowing agent (pentane) was optionally added. Next, with stirring, the polyisocyanate component (also temperature-controlled at 23° C.) was added to the polyol mixture, this was mixed intensively and the reaction mixture was poured into wooden moulds lined with paper. During the foaming operation, the setting time and tack-free time were determined. After 24 hours, cube-shaped test pieces with an edge length of 9 cm were cut out of the foam blank.

The following properties were determined:

Dimensional stability: determined by measuring the dimensional change in cube-shaped test pieces after storage for 24 hours at +80° C. Foams according to the invention exhibit relative changes in length of no more than 1% (absolute) for each spatial direction.

Core density: determined from the volume and the weight of a cut-out cube-shaped test piece.

KBT: Kleinbrennertest [small burner test] according to DIN 4102-1. Rigid foams according to the invention achieve the fire protection class B2.

BVD Test: in accordance with the Swiss Basic Test to Determine the Combustibility of Building Materials from the Vereinigung kantonaler Feuerversicherungen [Association of Cantonal Fire Insurers] in the edition of 1988, with the supplements of 1990, 1994, 1995 and 2005 (obtainable from Vereinigung kantonaler Feuerversicherungen, Bundesstr. 20, 3011 Bern, Switzerland).

Setting time: determined by dipping a wooden stick into the reacting polymer melt and lifting it out again. Characterises the time from which the polymer melt hardens.

Tack-free time characterises the condition of the surface of the foam. It is determined by dabbing the foam, when it is no longer rising, with a wooden stick. The time from which material no longer adheres is referred to as the tack-free time.

What is claimed is:

1. A process for producing a polyester polyol with a concentration of ether groups in the range of between 9.0 mol/kg polyester polyol and 22 mol/kg polyester polyol, consisting essentially of (i) reacting in a first step
  (A) a component selected from the group consisting of isophthalic acid, a $C_1$-$C_4$ alkyl ester of isophthalic acid, terephthalic acid, and a $C_1$-$C_4$ alkyl ester of terephthalic acid, with
  (B) an oligoethylene glycol of the formula H—$(OCH_2CH_2)_n$—OH in which the number-average number of oxyethylene groups n is in the range of between 3.0 and 9.0 and which contains exclusively primary hydroxyl groups,
in the presence of at least one catalyst selected from the group consisting of tin(II) salts, bismuth(II) salts and titanium tetraalkoxylates at a temperature in the range of between 160° C. and 240° C. and a pressure in the range of between 1 and 1013 mbar for a period in the range of between 7 and 100 hours, and
(ii) reacting in a second step the reaction mixture resulting from step (i) with
  (C) phthalic acid and/or phthalic anhydride.

2. The process according to claim 1, wherein component (A) is present in an amount of 8 to 50 wt. %, based on the total amount of the mixture.

3. The process according to claim 1, wherein component (B) is present in an amount of 50 to 92 wt. %, based on the total amount of the mixture.

4. The process according to claim 1, wherein component (C) is present in an amount of 1 to 25 wt. %, based on the total amount of the mixture.

5. The process according to claim 1, wherein the polyester polyol has a hydroxyl number in the range of between 100 mg KOH/g and 400 mg KOH/g.

6. The process according to claim 1, wherein the polyester polyol has a viscosity measured in accordance with DIN 53019 in the range of between 400 mPas and 10000 mPas at 25° C.

7. The process according to claim 1, wherein the oligoethylene glycol (B) has a number-average number of oxyethylene groups in the range of between 3.1 and 9.

8. The process according to claim 1, wherein the polyester polyol has a melting point in the range of between −40° C. and 25° C.

9. The process according to claim 1, wherein components (A) and (B) are reacted in the presence of at least one catalyst selected from the group consisting of tin(II) chloride, bismuth(II) chloride, titanium tetramethanolate and titanium tetraethanolate.

10. The process according to claim 1, wherein the catalysts selected from the group consisting of tin(II) salts, bismuth(II) salts and titanium tetraalkoxylates are used in total in an amount of 20 to 200 ppm, based on the sum of the parts by weight of all feedstock components A to C).

11. A polyester polyol obtainable by the process of claim 1.

12. A process for producing a PUR or PUR/PIR foam comprising reacting
   a) at least one polyester polyol according to claim 11 with
   b) at least one polyisocyanate-containing component,
   c) at least one blowing agent,
   d) at least one or more catalysts,
   e) optionally at least one flame retardant and/or other auxiliary substances and additives,
   f) optionally at least one compound with at least two isocyanate-reactive groups.

13. A PUR or PUR/PIR foam obtainable by the process according to claim 12.

14. The process according to claim 1, in which (A) is terephthalic acid, (B) is an oligoethylene glycol corresponding to the formula H—$(OCH_2CH_2)_n$—OH in which n is in the range of between 3.5 and 8, and (C) is phthalic anhydride.

15. A process for producing a polyester polyol with a concentration of ether groups in the range of between 9.0 mol/kg polyester polyol and 22 mol/kg polyester polyol, consisting essentially of
   (i) reacting in a first step
      (A) a component selected from the group consisting of isophthalic acid, a $C_1$-$C_4$ alkyl ester of isophthalic acid, terephthalic acid, and a $C_1$-$C_4$ alkyl ester of terephthalic acid, with
      (B) an oligoethylene glycol of the formula H—$(OCH_2CH_2)_n$—OH in which the number-average number of oxyethylene groups n is in the range of between 3.0 and 9.0 and which contains exclusively primary hydroxyl groups,
   in the presence of at least one catalyst selected from the group consisting of tin(II) salts, bismuth(II) salts and titanium tetraalkoxylates at a temperature in the range of between 160° C. and 240° C. and a pressure in the range of between 1 and 1013 mbar for a period in the range of between 7 and 100 hours, and
   (ii) reacting in a second step the reaction mixture resulting from step (i) with
      (C) phthalic acid and/or phthalic anhydride,
   with the proviso that less than 8% by weight of ethylene glycol and/or diethylene glycol, based on 100% by weight of components (A), (B) and (C), is present in the resultant polyester polyol.

16. The process according to claim 15, in which (A) is terephthalic acid, (B) is an oligoethylene glycol corresponding to the formula H—$(OCH_2CH_2)_n$—OH in which n is in the range of between 3.5 and 8, and (C) is phthalic anhydride.

17. The process according to claim 1, wherein said reaction in (ii) is at a temperature in the range of between 160 and 240° C. and a pressure of between 1 and 150 mbar for a period in the range of between 1 and 22 hours.

* * * * *